(12) United States Patent
Magner et al.

(10) Patent No.: US 7,392,774 B2
(45) Date of Patent: Jul. 1, 2008

(54) METHOD FOR CONTROLLING VALVE OVERLAP OF A VARIABLE VALVETRAIN ENGINE

(75) Inventors: Steve Magner, Farmington Hills, MI (US); Mrdjan Jankovic, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 122 days.

(21) Appl. No.: 11/424,878

(22) Filed: Jun. 19, 2006

(65) Prior Publication Data

US 2007/0289563 A1    Dec. 20, 2007

(51) Int. Cl.
*F01L 1/34* (2006.01)
(52) U.S. Cl. ............... 123/90.17; 123/90.15; 123/90.31
(58) Field of Classification Search ............... 123/90.17, 123/90.15, 90.31
See application file for complete search history.

(56) References Cited

U.S. PATENT DOCUMENTS

| | | | |
|---|---|---|---|
| 4,917,058 A * | 4/1990 | Nelson et al. ............ | 123/90.17 |
| 5,769,044 A * | 6/1998 | Moriya ..................... | 123/90.17 |
| 6,209,516 B1 * | 4/2001 | Yamashita ................. | 123/305 |
| 6,325,029 B1 | 12/2001 | Takahashi | |
| 6,386,158 B1 | 5/2002 | Takahashi | |
| 6,539,902 B2 | 4/2003 | Kadowaki | |
| 6,842,691 B2 | 1/2005 | Hagner et al. | |
| 6,904,881 B2 | 6/2005 | Hirowatari et al. | |
| 6,938,593 B2 | 9/2005 | Magner et al. | |
| 2005/0193995 A1 * | 9/2005 | Nomura ................. | 123/568.14 |

* cited by examiner

*Primary Examiner*—Zelalem Eshete
(74) *Attorney, Agent, or Firm*—Donald J. Lewis

(57) ABSTRACT

A method for controlling valve timing for and engine having adjustable valve timing is presented. In one embodiment, the method allows the intake valve timing to be controlled with respect to exhaust valve timing or the method allows the exhaust valve timing to be controlled with respect to intake valve timing. In addition, the method can bound valve overlap between upper and lower limits so that engine emissions and fuel economy may be improved.

20 Claims, 6 Drawing Sheets

METHOD FOR CONTROLLING VALVE OVERLAP OF A VARIABLE VALVETRAIN ENGINE

FIELD

The present description relates to a method for controlling the phase of one or more cams relative to the crankshaft of an internal combustion engine.

BACKGROUND

The performance, fuel economy, and emissions of an internal combustion engine may be altered by varying the engine valve timing. One method to control valve timing is presented in U.S. Pat. No. 6,904,881. In one embodiment, a method is described wherein the timing adjustment of an intake valve is prohibited until the valve timing of the exhaust valve approaches the control target. In other words, this approach limits intake cam movement based on how well the exhaust cam follows a desired trajectory or profile. The objective of this method is to regulate the amount of overlap between exhaust and intake valves. That is, the approach seeks to control the amount of time that the intake and exhaust valves are simultaneously open. By regulating the amount of overlap, the method intends to improve combustion stability and engine torque while the engine accelerates and the cams are repositioned.

The above-mentioned method can also have several disadvantages. Specifically, the method always limits the movement of an intake cam based on the position of an exhaust cam. Strictly constraining the movement of the intake cam based on the position of the exhaust cam can be undesirable during some conditions. For example, when an exhaust cam is being retarded faster than the rate that an intake cam can be adjusted, it is possible to exceed a desired overlap because retarding the exhaust cam faster than the intake cam will increase the relative distance between the exhaust valve closing and the intake valve opening, thereby increasing the overlap and the possibility of engine misfire. Further, engine power can be reduced when overlap is increased to the point where it is possible to pass an uncombusted air-fuel charge from the intake manifold to the exhaust manifold (blow-through).

The inventors herein have recognized the above-mentioned disadvantages and have developed a method to control engine valves that offers substantial improvements.

SUMMARY

One example approach to overcome at least some of the disadvantages of prior approach includes a method for adjusting valve timing of an engine having adjustable valve timing, the method comprising: adjusting the timing of a first valve operating in a cylinder of an internal combustion engine in response to the timing of a second valve operating in said cylinder during a first operating mode; and adjusting the timing of said second valve in response to the timing of said first valve during a second operating mode. This method can be used to reduce the above-mentioned limitations of the prior art approach.

When the timing of an intake valve can be adjusted in relation to the timing of an exhaust valve and vice-versa it is possible to improve valve overlap control. For example, overlap control can be improved for an engine configured with an exhaust cam that moves at a slower rate than the intake cam and where the distance traveled by the intake cam is greater than the distance traveled by the exhaust cam. Moving the exhaust cam and the intake cam from retarded positions to advanced positions can produce an undesirable amount of overlap. The faster moving intake cam causes the intake cam timing to lead the exhaust cam timing so that the actual overlap and the effective overlap increase as the cams are repositioned. However, by restricting the intake cam position based on the exhaust cam position, undesirable longer duration overlaps that may be avoided.

On the other hand, when moving the above-mentioned cams from advanced positions to retarded positions, it is possible that the amount of effective overlap is less than desired. This is possible because the actuators travel different distances at different rates and therefore the overlap trajectories when going from an advanced position to a retarded position are not the same as when going from a retarded position to an advanced position. Consequently, it can be desirable during certain conditions to restrict the exhaust cam movement in response to the intake cam position. In doing so, the overlap trajectory can be controlled to closer follow to the effective overlap limit where it is possible for the engine to use additional exhaust gas residuals. As a result, engine emissions and fuel economy may be improved.

The present description provides several advantages. For example, the method can allow a system having different rate actuators and/or actuators that can travel different distances to better follow a trajectory that improves engine emissions and fuel economy whether the cams are being retarded or advanced. In addition, the method can reduce the possibility of misfires and blow-through that may occur as a result of longer valve overlap periods.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
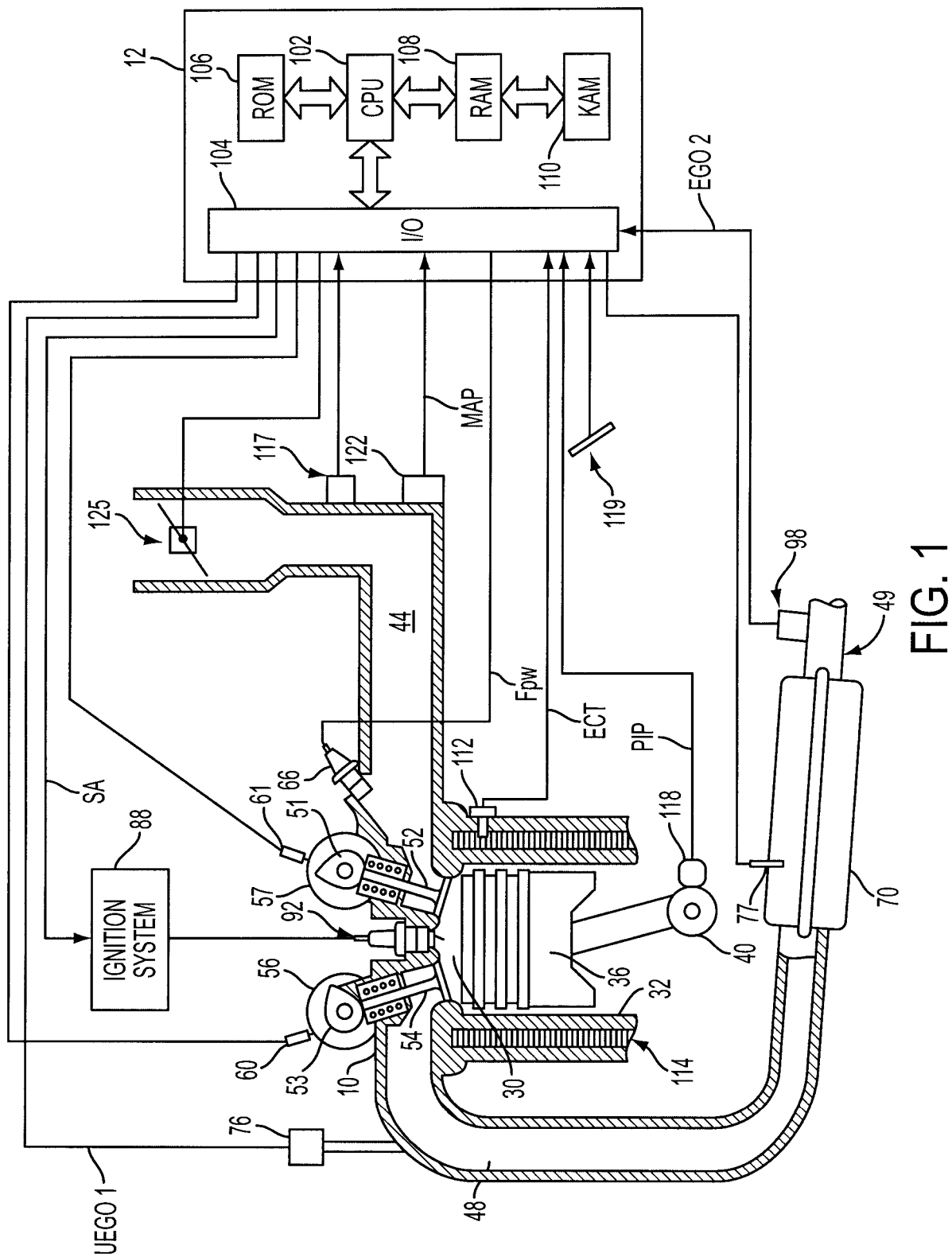
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 an exhaust valve 54. The intake and exhaust valves are operated via cam 53 and cam 51 respectively. Engine controller 12 provides electrical control signals for positioning hydraulic actuators 56 and 57 that adjust the phase of cams 53 and 51. Alternatively, both exhaust valve 54 and intake valve 52 may be operated by variable event actuators that adjust both valve lift and valve timing. The variable event valve actuator may be a mechanical apparatus that is controlled by electrical or hydraulic components, or alternatively, the valve actuator may be electrically or hydraulically driven, or may be comprised of a combination of mechanical, electrical, and/or hydraulic components, electromechanical valves for example. In addition, the valve actuator may be capable of adjusting valve lift, valve phase or the combination of phase and lift. Some actuator designs may allow zero valve lift, a minimum lift, negative valve overlap between intake and exhaust valves, positive valve overlap between intake and exhaust valves, and/or combinations of lift and phase adjustment amounts. U.S. Pat. No. 6,145,483 describes one example of a variable valve actuator and is hereby fully incorporated by reference.

Intake manifold 44 is shown having fuel injector 66 coupled thereto for delivering liquid fuel in proportion to the pulse width of signal FPW from controller 12. Fuel is delivered to fuel injector 66 by fuel system (not shown) including a fuel tank, fuel pump, and fuel rail (not shown). Alternatively, the engine may be configured such that the fuel is injected directly into the engine cylinder, which is known to those skilled in the art as direct injection. In addition, intake manifold 44 is shown communicating with electronic throttle 125. Further, an air mass sensor (not shown) may be located upstream of throttle 125, if desired.

Distributorless ignition system 88 provides ignition spark to combustion chamber 30 via spark plug 92 in response to controller 12. Universal Exhaust Gas Oxygen (UEGO) sensor 76 is shown coupled to exhaust manifold 48 upstream of catalytic converter 70. Alternatively, a two-state exhaust gas oxygen sensor may be substituted for UEGO sensor 76. Two-state exhaust gas oxygen sensor 98 is shown coupled to exhaust pipe 49 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example. Alternatively, the converter may be a NOx trap, Hydrocarbon trap, oxidation catalyst, or a selective oxidation catalyst.

Controller 12 is shown in FIG. 1 as a conventional microcomputer including: microprocessor unit 102, input/output ports 104, and read-only-memory 106, random-access-memory 108, keep-alive-memory 110, and a conventional data bus. Controller 12 is shown receiving various signals from sensors coupled to engine 10, in addition to those signals previously discussed, including: engine coolant temperature (ECT) from temperature sensor 112 coupled to water jacket 114; a position sensor 119 coupled to an accelerator pedal; a measurement of engine manifold pressure (MAP) from pressure sensor 122 coupled to intake manifold 44; a measurement (ACT) of engine air charge temperature or manifold temperature from temperature sensor 117; and an engine position sensor from a Hall effect sensor 118 sensing crankshaft 40 position. In a preferred aspect of the present description, engine position sensor 118 produces a predetermined number of equally spaced pulses every revolution of the crankshaft from which engine speed (RPM) can be determined.

Figure 2:
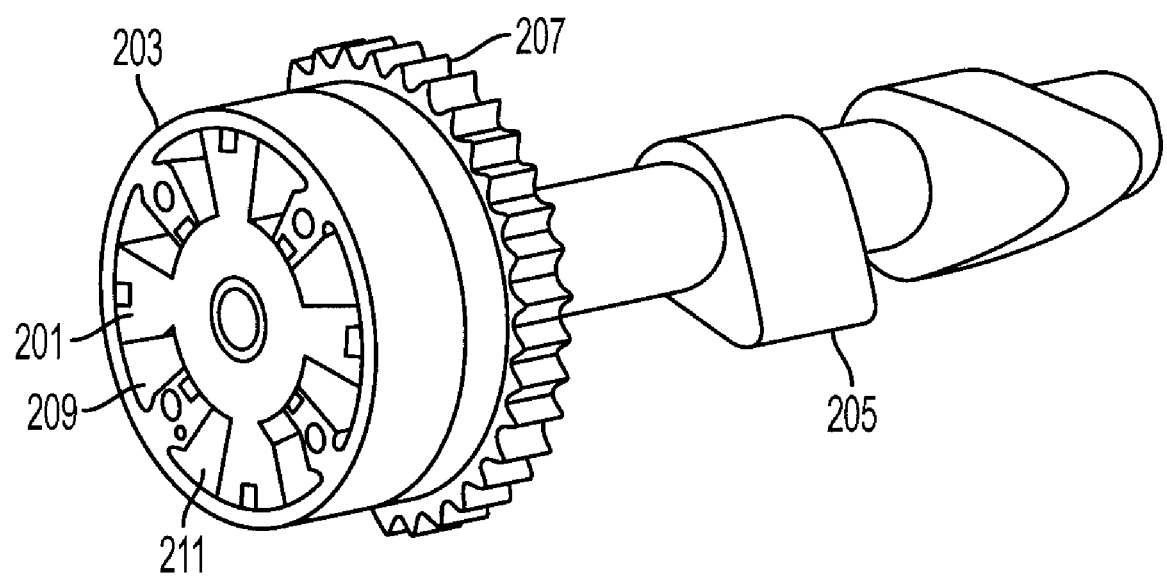
FIG. 2 is a schematic diagram of an example camshaft adjustment means.

Referring now to FIG. 2, an example of a hydraulically actuated mechanism for adjusting the phase between a camshaft and a crankshaft of an internal combustion engine is shown. The actuator mechanism is coupled to the engine crankshaft by a belt or chain through sprocket 207. The sprocket is attached to a wheel hub 203 that houses rotor 201. The rotor can move relative to the hub by applying hydraulic oil pressure to the advance chamber 211 or to the retard chamber 209. Since the rotor 201 is directly coupled to camshaft 205 the camshaft moves relative to the sprocket and the crankshaft. Note that some designs permit the rotor to be pined in a fixed position so that during conditions of low hydraulic pressure the relationship between the camshaft and crankshaft may be held fixed.

Figure 3:
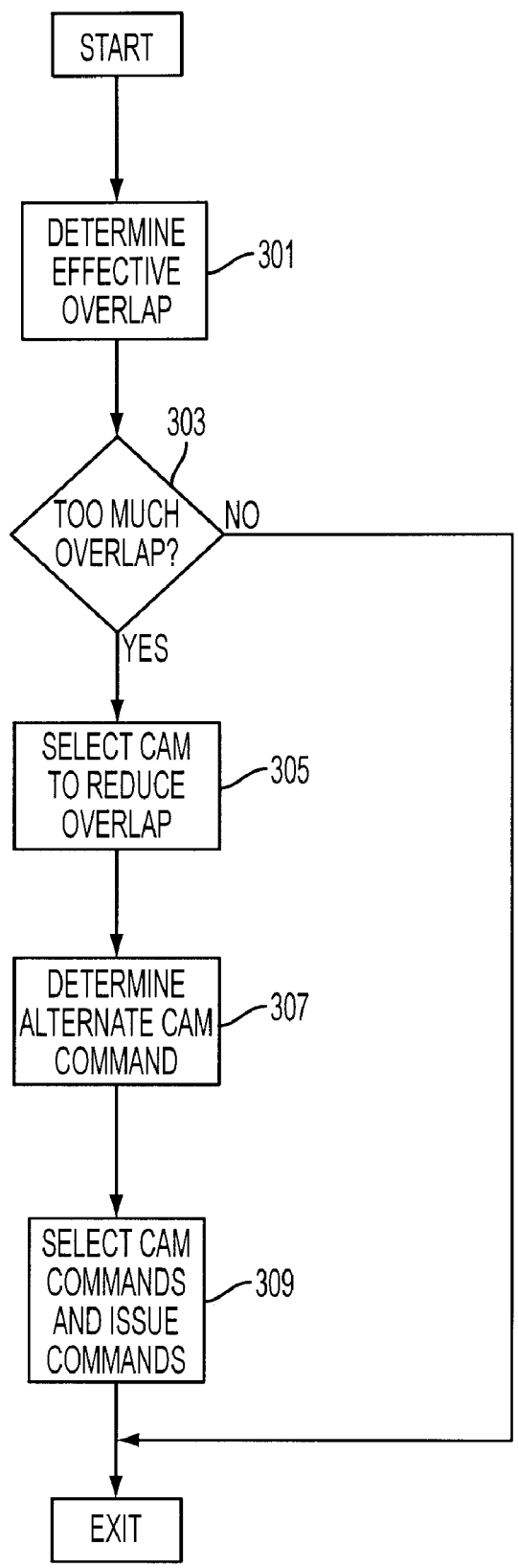
FIG. 3 is a flow chart of a valve timing control strategy.

Referring now to FIG. 3, a flow chart of an example valve timing method is shown. The method of FIG. 3 is intended to be used in conjunction with a routine that schedules intake and exhaust cam timing in response to engine operating conditions such as engine speed, engine load, and operator demand torque, for example. The scheduled cam position commands are applied through variables iVCT_des and eVCT_des respectively. The scheduled overlap and the actual overlap are used to determine whether a control adjustment is to be applied to alter the effective overlap. Cam advance is treated as a smaller number while retard is indicated by a larger number.

At step 301, the routine determines the effective overlap between the intake valves and the exhaust valves. The term effective overlap is used to describe how a given amount of actual valve overlap will affect engine combustion stability. In other words, the effective overlap is a way of transforming valve timing into a normalized measure of combustion stability. The effective overlap is determined by interrogating a table that is indexed using the intake valve opening (IVO) position and the exhaust valve closing (EVC) position. Further, engine speed and/or engine load can also be included as factors to determine effective overlap. The effective overlap is expressed in one example as:

$$eff\_overlap = Function\_iVCT\_eVCT(iVCT, eVCT)$$

Where Function_iVCT_eVCT is a table that is indexed by the intake cam position iVCT and the exhaust cam position eVCT and outputs the variable eff_overlap. The effective overlap table contains values between zero and two that describe combustion stability based on empirically determined engine data. A value of zero indicates vary stable combustion while a value of two indicates unstable combustion. Nominal combustion is indicated by a value of one. Thus, combustion stability degrades between values one and two while it improves between values one and zero. The actual cam positions (eVCT and iVCT), relative to the crankshaft, and the valve timings that they represent are determined from sensors 60 and 61 which sense the position of teeth as the camshafts rotate. The routine then proceeds to step 303.

At step 303, the routine determines if there is too much effective valve overlap. The routine compares the effective overlap determined in step 301 to a predetermined value. The predetermined value may be a constant or it may vary with engine operating conditions, for example. If too much overlap is determined the routine sets flag act_ovr to one and proceeds to step 305, if not act_ovr is set to zero and the routine proceeds to exit.

It is also possible to increase or decrease the predetermined value of overlap by adding a tolerance to the overlap. This can provide a buffer so that an amount of overlap is not exceeded between executions of the routine. The buffered overlap is determined from the following equation:

overlap_total=overlap_dsd-overlap_tol

Where overlap_total is the total overlap amount or buffered overlap, overlap_dsd is a predetermined desired amount of overlap, and overlap_tol is the amount of overlap tolerance. If eff_overlap exceeds overlap_total the overlap flag act_ovr is set to one, otherwise it is set to zero. The routine proceeds to step 305.

In step 305, the routine selects cams to adjust. One way to determine which cam to adjust is to compare the position of each cam to its desired position. If the intake cam actual position is greater than the intake cam desired position then the logic indicates high overlap and that overlap is increasing so the routine sets the intake cam overlap flag, iVCT_ovr, to one. If high overlap is not indicated the flag is set to zero. The exhaust overlap is tested in a similar manner and the exhaust overlap flag, eVCT_ovr, is set to one if there is high overlap and if the exhaust cam is headed in a direction that increases overlap. The before-mentioned overlap flags are set for the cam actuator that is moving in a direction that increases overlap and if both cams are headed in directions that increase overlap then both intake and exhaust overlap flags are set. Otherwise, the flag is set to zero. The routine proceeds to step 307.

In step 307, alternate commands for actuators that are increasing overlap are determined. Modified commands for the intake cam and exhaust cam actuators are determined by the following equations:

iVCT_adj_ovr=Function_iVCT_for_ovr(overlap_total,eVCT)

eVCT_adj_ovr=Function_eVCT_for_ovr(overlap_total,iVCT)

Where Function_iVCT_for_ovr is a table of empirically determined values that have an output corresponding to intake valve position, iVCT_adj_ovr, that is determined by indexing the table using the total amount of desired overlap, overlap_total, and the actual exhaust cam position, eVCT. The revised exhaust valve position, eVCT_adj_ovr, is determined by indexing Function_eVCT_for_ovr in a similar manner. The data is similar to the data described in step 301, however, the tables in this step output intake and exhaust valve positions rather than an effective overlap amount. Accordingly, the tables of this step are indexed by an overlap amount and a valve position. The routine proceeds to step 309.

In step 309, the cam commands are selected and passed on to the cam position controller. The cam overlap flag status for each cam is interrogated and the cam control commands are set based on the flag status. The intake cam command, iVCT_com, is set to iVCT_adj_ovr if the overlap is greater than desired and if the intake cam is increasing the overlap amount, or the command is set to iVCT_des if the overlap is less than or equal to the desired amount. The exhaust cam command, eVCT_com, is set to eVCT_adj_ovr if the overlap is greater than desired and if the exhaust cam is increasing the overlap amount, or the command is set to eVCT_des if the overlap is less than or equal to the desired amount. Note that it is also possible in step 309 to adjust the control signal to the cam that is limiting the system response. For example, if the exhaust cam is moving slower than desired and is off trajectory, thereby affecting the overlap during the transient, the control command to the exhaust cam may be increased to improve the exhaust cam trajectory.

The closed-loop cam position controllers issue the final cam control commands based on the iVCT_com and eVCT_com. The closed-loop controllers may be constructed based on one of a variety of well known configurations such as proportional-integral, proportional-derivative, or linear-quadratic, for example. After passing the exhaust and intake control commands to the cam position controller the routine exits.

Figure 5A:
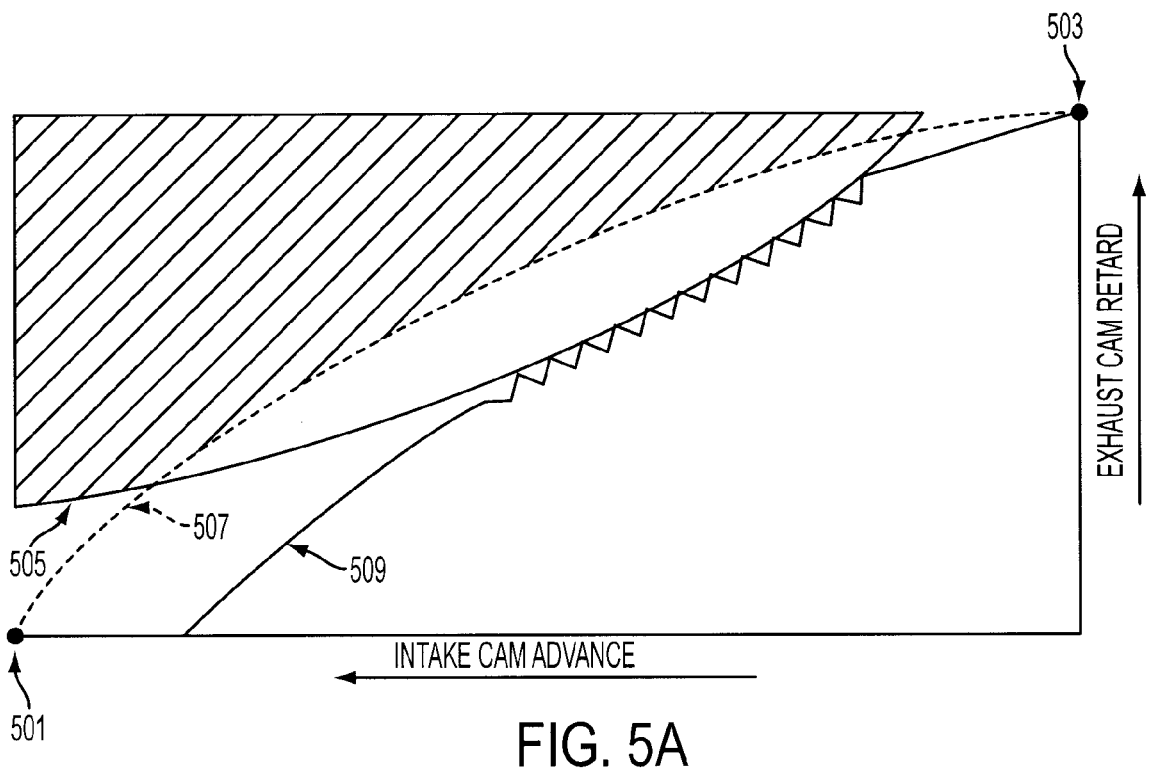
FIG. 5a is a example valve timing trajectory for an engine having adjustable valve timing.

Thus, during conditions where the amount of overlap is greater than desired, the method of FIG. 3 acts to control the cam that is moving in a direction that increases overlap while allowing a cam that is moving in a direction that maintains or reduces overlap to maintain its trajectory. That is, the valve timing of at least one valve (e.g., an intake valve or exhaust valve) is adjusted in response to the amount of overlap between the intake and exhaust valves. If both cams are moving in a direction that increases overlap the cam is moved to an acceptable overlap position and is maintained in the position until the scheduled overlap moves the cam to another acceptable overlap position. As a result, the method of FIG. 3 provides an overlap upper boundary that limits the amount of overlap and provides an acceptable amount of overlap even during varying operating conditions and varying actuator transfer rates. An example of the operating concept is illustrated in FIG. 5a.

Figure 4:
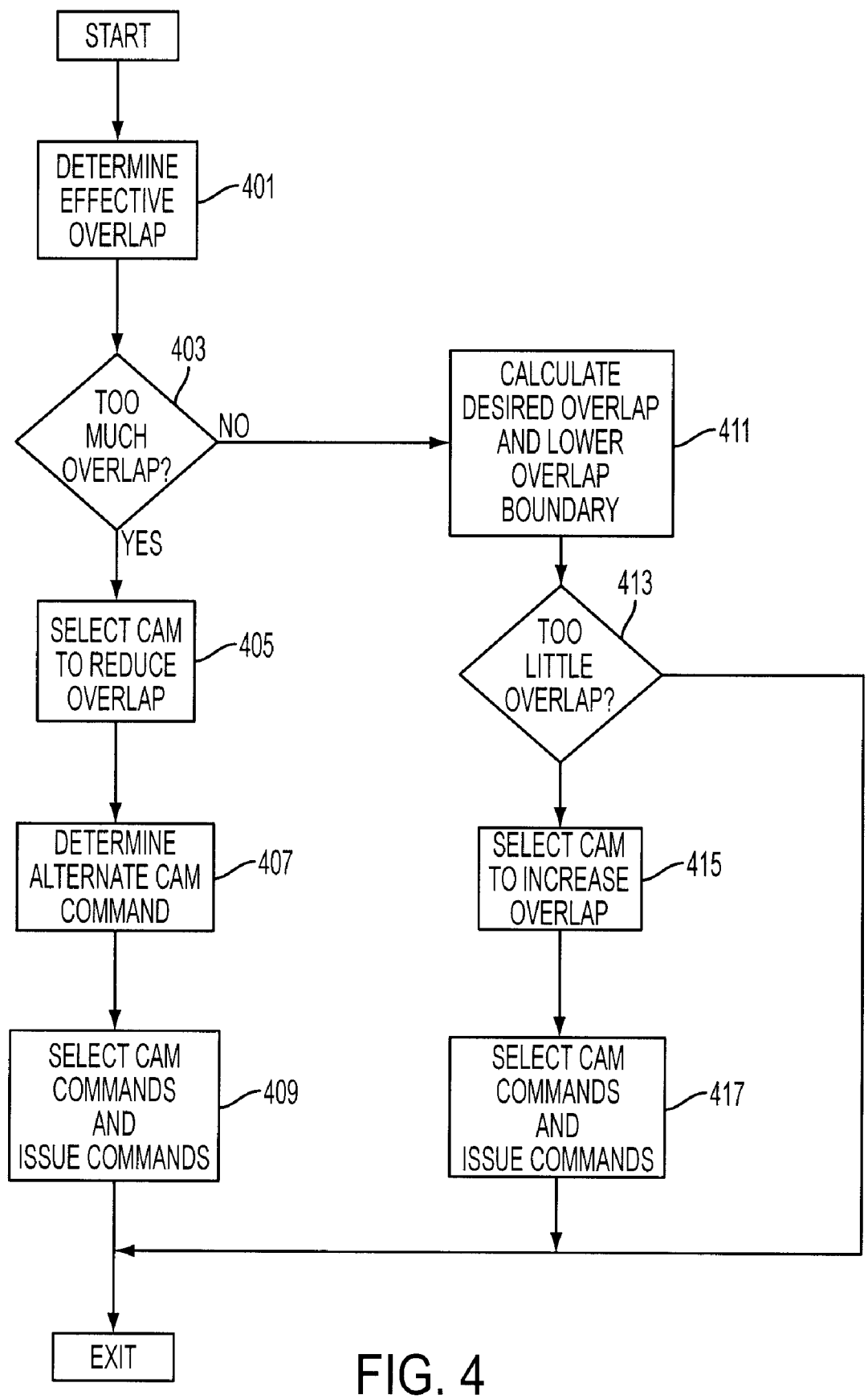
FIG. 4 is a flow chart of an alternate valve timing control strategy.

Referring now to FIG. 4, an alternative valve control strategy is shown. The method of FIG. 4 is similar to the method of FIG. 3, but a lower overlap boundary is also included. The lower overlap boundary is used to control the valve timing so that a certain amount of valve overlap is maintained. When the upper and lower boundaries are combined, an acceptable overlap region is created that seeks to provide an overlap amount that allows stable combustion, improved engine emissions, and improved fuel economy.

The process and function of steps 401 through 409 are identical to FIG. 3 steps 301 through 309. Therefore, the description of these steps has been omitted from FIG. 4 to reduce repetition.

In step 411, desired overlap and the lower boundary overlap are determined. In one example, the desired overlap and lower boundary are determined from the following equations:

Des_ovr=Des_evc-Des_ivo

Ovr_lo_bdy=Des_ovr-del_ovr

Where Des_ovr is the desired overlap, Des_evc is the desired exhaust valve closing position, Des_ivo is the desired intake valve opening location, Ovr_lo_bdy is the overlap lower boundary position, and del_ovr is a tolerance similar to the one described in FIG. 3, step 303. Note that valve advance is treated as a smaller number while retard is indicated by a larger number. The routine proceeds to step 413.

In step 413, the routine determines if there is less overlap than desired. If the overlap is less than a desired amount the routine proceeds to step 415, otherwise the routine exits. The routine determines that there is too little overlap from the following equation:

evc-ivo<Ovr_lo_bdy

Where evc is the exhaust valve closing position and ivo is the intake valve opening position. If the overlap is under a desired amount, the actuator low overlap flag, act_udr, is set to one. Otherwise, the flag is set to zero.

In step 415, the routine selects cams to adjust. One way to determine which cam to adjust is to compare the position of each cam to its desired position. If the intake cam actual position is less than the intake cam desired position then the logic indicates low overlap and that overlap is decreasing so the routine sets the intake cam underlap flag, iVCT_udr, to one. If low overlap is not indicated the flag is set to zero. The exhaust overlap is tested in a similar manner and the exhaust underlap flag, eVCT_udr, is set to one if there is low overlap and if the exhaust cam is headed in a direction that decreases overlap. The before-mentioned underlap flags are set for the cam actuator that is moving in a direction that decreases overlap and if both cams are headed in directions that decrease overlap then both intake and exhaust overlap flags are set. Otherwise, the flag is set to zero. The routine proceeds to step 417. Note that it is also possible in step 415 to adjust the control signal to the cam that is limiting the system response. For example, if the exhaust cam is moving slower than desired and is off trajectory, thereby affecting the intake cam, the control command to the exhaust cam may be increased to improve the exhaust cam trajectory.

In step 417, the cam commands are selected and passed on to the cam position controller. The cam overlap flag status for each cam is interrogated and the cam control commands are set based on the flag status. The intake cam command, iVCT_com, is set to evc-Ovr_lo_bdy if the overlap is less than desired and if the intake cam is decreasing the overlap amount, or the command is set to iVCT_des if the overlap is less than or equal to the desired amount. The exhaust cam command, eVCT_com, is set to ivo+Ovr_lo_bdy if the overlap is less than desired and if the exhaust cam is decreasing the overlap amount, or the command is set to eVCT_des if the overlap is less than or equal to the desired amount.

In another embodiment of the method of FIGS. 3 and/or 4, one or more controller gains can be adjusted for cams that are off trajectory or for one or more cams when the overlap amount is less than or greater than a desired amount. In other words, the controller gain may be adjusted, in response to an error amount for example, instead of looking up a command from a table or function.

The closed-loop cam position controllers issue the final cam control commands based on the iVCT_com and eVCT_com. After passing the exhaust and intake control commands to the cam position controller the routine exits.

Figure 5B:
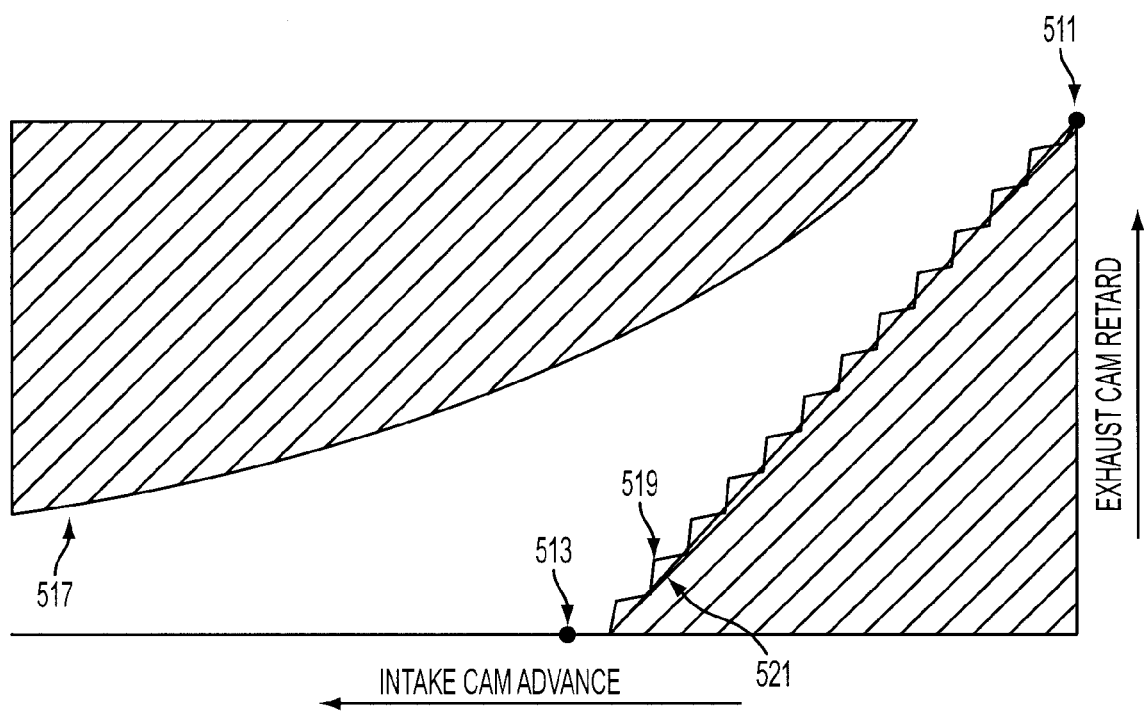
FIG. 5b is another example valve timing trajectory for an engine having adjustable valve timing.

Thus, the method of FIG. 4 acts to control and/or adjust intake and exhaust cams so that the valve overlap is between upper and lower boundaries. In other words, the timing of one cam or valve may be adjusted in response to the amount of overlap between two valves. Further, as mentioned above, the control command to an off trajectory valve can also be adjusted so that the overlap and off trajectory valve are simultaneously controlled. An example of this operating concept is illustrated in FIG. 5b.

Referring now to FIG. 5a, an example illustration of the method of FIG. 3 is shown. Intake cam timing is represented by the x-axis. The origin represents the most retarded cam timing while location 501 represents the most advanced cam timing location. Exhaust valve timing is represented by the y-axis. The origin represents the most advances cam timing while location 503 represents the most retarded cam timing location. The high overlap region is shown by the cross hatching and its boundary is identified by 505. In this example, the intake cam actuator stroke (i.e., the distance from the fully retarded position to the fully advanced position) is longer than the exhaust cam actuator stroke, but in other examples the actuator strokes may be the same distance or the exhaust cam actuator stroke may be longer than the intake cam actuator stroke.

Curve 507 represents a timing trajectory where the intake cam actuator is faster than the exhaust cam actuator and where the cams are not controlled to mitigate high overlap conditions. The curve begins at location 503 and ends at location 501. Note that if the cams are moved from location 501 to location 503 the trajectory will follow an alternative route since the actuator strokes and speeds are different. This curve illustrates how actuator speed and stroke can affect the valve overlap amount.

Curve 509 represents an example valve overlap amount that is controlled by the method of FIG. 3. Starting at location 503 the overlap proceeds to the left until the upper overlap boundary 505 is encountered. The overlap is controlled by allowing the exhaust cam to continue to advance (moving in an overlap reducing direction) while the intake cam is held and then released periodically. When the upper overlap boundary is no longer encountered the cams are allowed to progress at nominal rates until position 501 is reached. The cams move such that the overlap follows the overlap boundary in a stair-step like manner. The overlap trajectory may be extended into the upper boundary region by a predetermined amount, if desired.

Referring now to FIG. 5b, an example illustration of the method of FIG. 4 is shown. Similar to FIG. 5a, the x-axis represents exhaust cam position while the y-axis represents intake cam position. Curve 517 represents the overlap upper boundary limit while curve 521 represents the overlap lower boundary limit.

In this example, the cam movement sequence begins at location 511. Here, both the exhaust cam and intake cam are retarded. The exhaust cam moves at a faster rate than the intake cam until the lower boundary overlap limit is encountered. Then, the exhaust cam movement is reduced while the intake cam is allowed to continue at its nominal pace. As the intake cam proceeds, the exhaust cam is held and released so that the lower boundary is followed. The overlap profile follows a stair-step route where the exhaust cam hold time is related to the rate that the cam positioning algorithm is executed. The profile continues until the cam positions are held at location 513. If the operating conditions had changed in this example, the cams could have encountered the upper overlap boundary at which time the overlap would have been limited rather than driven toward an increased overlap amount. Note that while FIGS. 5a and 5b illustrate situations where there is a fast exhaust cam the system is effective where the intake cam is faster or where the cams operate at substantially the same rate. Further, it is anticipated that other overlap regulating methods may be used to maintain overlap between the upper and lower boundary, and therefore the method is not limited to the "run and hold" method described above.

Figure 6:
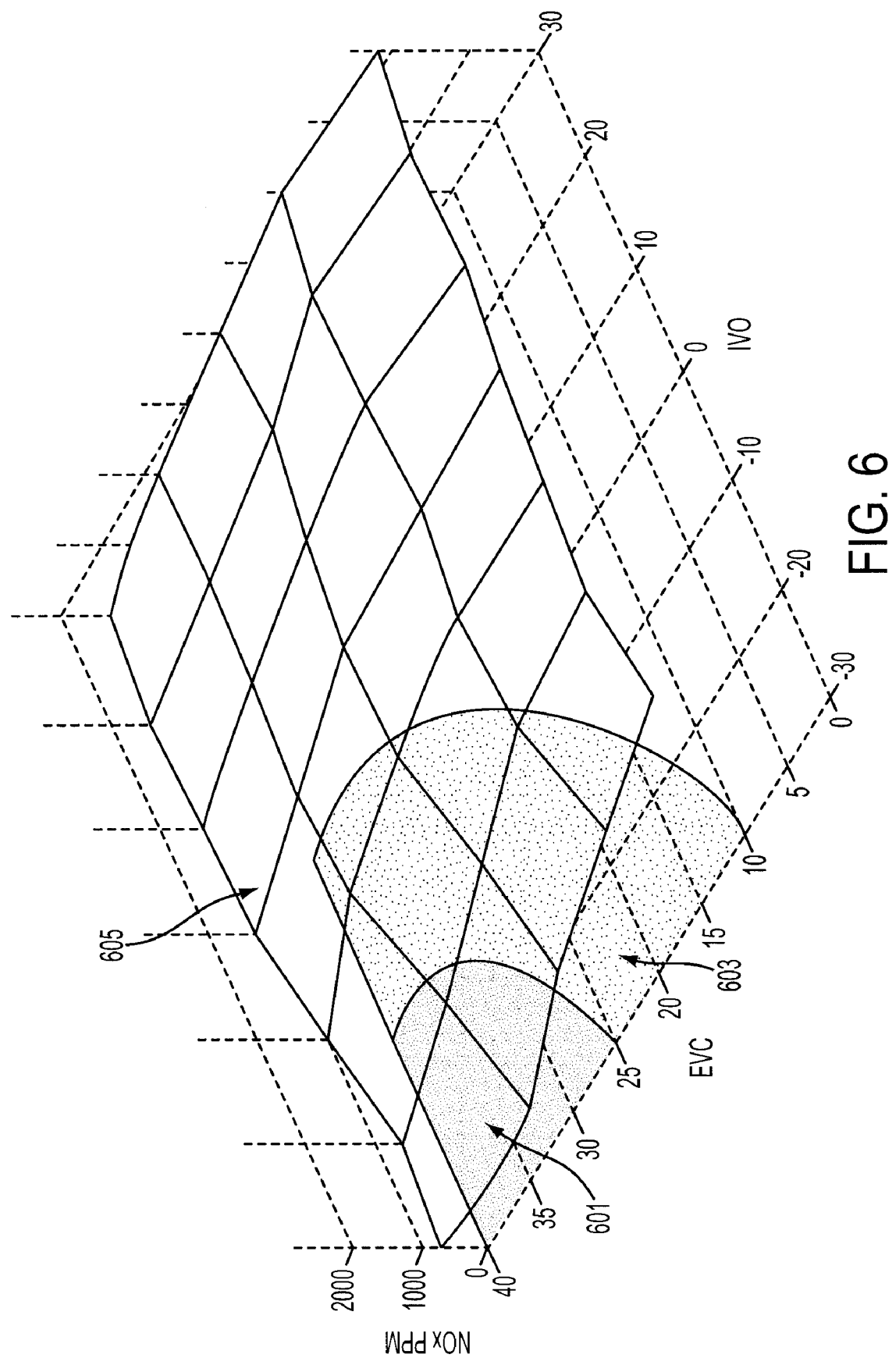
FIG. 6 is a surface plot that illustrates the engine NOx reduction that is possible by using a method of the present description.

Referring now to FIG. 6, a plot that illustrates the effect overlap has on engine $NO_x$ is shown. The data are representative for an engine operating at a substantially constant speed and load. The plot has three dimensions, intake valve opening location, exhaust valve closing location, and engine output $NO_x$. The EVC axis starts at intake stroke top-dead-center and extends to forty degrees after top-dead-center. The IVO axis starts at minus thirty degrees and extends to thirty degrees. Minus thirty refers to thirty degrees advanced of top-dead-center intake stroke while positive thirty refers thirty degrees retarded from top-dead-center intake stroke. Exhaust gas $NO_x$ concentration is expressed in parts-per-million parts of exhaust gas. Area 601 represents an example overlap region where the overlap can produce degraded combustion. Area 603 represents an overlap region where combustion is improved and is generally stable. Fuel economy in this region is improved as well because engine misfires are low and because the engine can operate in a less throttled region. $NO_x$ is illustrated by surface plot 605.

The engine exhaust gas is primarily comprised of hydrocarbons, carbon-dioxide, carbon-monoxide, and oxides of nitrogen. Directly above region 601 the engine $NO_x$ is at roughly 600 parts per million. Notice that the $NO_x$ concentration increases as IVO is retarded and as EVC is advanced. This occurs because the reduction in overlap decreases the amount of residual gas in the cylinder. Thus, where there is much overlap engine $NO_x$ is lower, but combustion stability is reduced. On the other hand, where combustion stability is higher, overlap engine $NO_x$ is higher. Consequently, the methods of FIGS. 3 and 4 can be use to bound the overlap along the boundaries of region 603, for example. By bounding, engine emissions are reduced and fuel economy is increased.

As will be appreciated by one of ordinary skill in the art, the routines described in FIGS. 3 and 4 may represent one or more of any number of processing strategies such as event-driven, interrupt-driven, multitasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but it is provided for ease of illustration and description. Although not explicitly illustrated, one of ordinary skill in the art will recognize that one or more of the illustrated steps or functions may be repeatedly performed depending on the particular strategy being used. Further, the before-mentioned routines may be modified without deviating from the scope or intent of the present description.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for adjusting valve timing of an engine having adjustable valve timing, the method comprising:
   adjusting the timing of a first valve operating in a cylinder of an internal combustion engine in response to the timing of a second valve operating in said cylinder during a first operating mode; and
   adjusting the timing of said second valve in response to the timing of said first valve during a second operating mode.

2. The method of claim 1 wherein said first valve is an intake valve and wherein said second valve is an exhaust valve.

3. The method of claim 1 wherein said first valve is an exhaust valve and wherein said second valve is an intake valve.

4. The method of claim 1 wherein said at least one of said first and said second valve changes timing relative to a crankshaft by a hydraulic actuator.

5. The method of claim 1 wherein said adjustment of said timing of said first valve includes temporarily stopping the phase angle change between said timing of said first valve and the engine crankshaft while the phase angle between the second valve and the crankshaft continues to vary.

6. A method for adjusting valve timing of an engine having adjustable valve timing, the method comprising:
   adjusting the timing of a first valve operating in a cylinder of an internal combustion engine by moving a cam in response to the amount of overlap between said first valve and a second valve operating in said cylinder and in response to whether the direction of cam movement increases or decreases said overlap.

7. The method of claim 6 wherein said overlap is positive overlap.

8. The method of claim 6 wherein said overlap is negative overlap.

9. The method of claim 6 wherein the adjustment of timing of said first valve limits the amount of time that said first valve and said second valve are open at the same time.

10. The method of claim 6 wherein said engine is a spark ignition engine.

11. The method of claim 9 wherein said amount of time that said first valve and said second valve are open at the same time varies with an engine operating condition.

12. A method for adjusting valve timing of an engine having adjustable valve timing, the method comprising:
   adjusting the timing of a first valve operating in a cylinder of an internal combustion engine by moving a cam in response to the amount of overlap between said first valve and a second valve operating in said cylinder and in response to whether the direction of cam movement increases or decreases said overlap; and
   adjusting the control command to an actuator that adjusts the timing of said second valve when the timing of said second valve varies from a desired timing.

13. The method of claim 12 wherein said engine is a compression ignition engine.

14. The method of claim 12 wherein said desired timing is adjusted in response to engine speed, desired cylinder air charge, or determined cylinder air charge.

15. The method of claim 12 wherein said command to said actuator is increased when said timing of said second valve is less than said desired timing.

16. The method of claim 12 wherein said command to said actuator is decreased when said timing of second valve is greater than said desired timing.

17. The method of claim 12 wherein said first valve is an intake valve and wherein said second valve is an exhaust valve.

18. The method of claim 12 wherein said first valve is an exhaust valve and wherein said second valve is an intake valve.

19. A computer readable storage medium having stored data representing instructions executable by a computer to control an engine having adjustable valve timing, said storage medium comprising:
   instructions for adjusting the timing of a first valve operating in a cylinder of an internal combustion engine in response to the amount of overlap between said first valve and a second valve, said adjustment limiting the duration of valve overlap between said first valve and said second valve to being between a overlap upper limit and an overlap lower limit; and
   instructions for adjusting the control command to an actuator that adjusts the timing of said second valve when the timing of said second valve varies from a desired timing.

20. A computer readable storage medium having stored data representing instructions executable by a computer to control an engine having adjustable valve timing, said storage medium comprising:
   instructions for adjusting the timing of a first valve operating in a cylinder of an internal combustion engine in response to the amount of overlap between said first valve and a second valve, said adjustment limiting the duration of valve overlap between said first valve and said second valve;

instructions for adjusting the control command to an actuator that adjusts the timing of said second valve when the timing of said second valve varies from a desired timing; and instructions to select one of said first valve or said second valve to have priority over the other valve when said first valve and said second valve are in the process of changing positions.

* * * * *